Figures 1, 2:
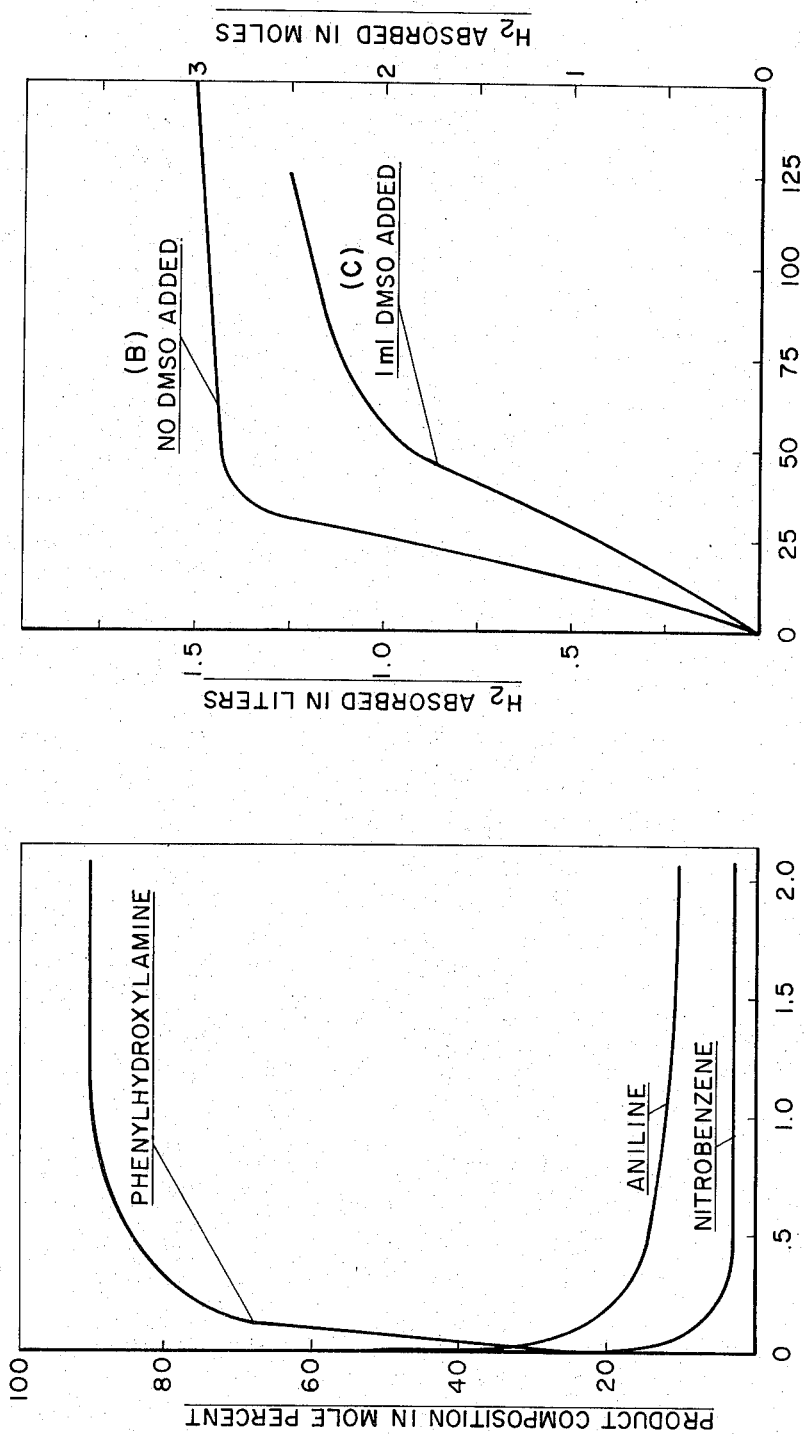

United States Patent
Rylander et al.

[15] 3,694,509
[45] Sept. 26, 1972

[54] SELECTIVE HYDROGENATION OF NITROAROMATICS TO THE CORRESPONDING N-ARYLHYDROXYLAMINE

[72] Inventors: Paul N. Rylander, Newark; Irene M. Karpenko, Irvington; George R. Pond, Newark, all of N.J.

[73] Assignee: Engelhard Minerals & Chemicals Corporation

[22] Filed: April 16, 1970

[21] Appl. No.: 29,055

[52] U.S. Cl...................................260/578, 260/580
[51] Int. Cl..............................................C07c 87/48
[58] Field of Search.................260/578, 580, 583 DD

[56] References Cited

UNITED STATES PATENTS 2,894,036  7/1959  Graham...................260/580
3,491,151  1/1970  Bader.......................260/584

Primary Examiner—Joseph Rebold
Assistant Examiner—Donald M. Papuga
Attorney—Miriam W. Leff and Samuel Kahn

[57] ABSTRACT

Nitroaromatics are selectively hydrogenated in neutral media in the presence of precious metal catalysts and in the presence of dimethylsulfoxide to produce N-arylhydroxylamines in high yield.

2 Claims, 4 Drawing Figures

PATENTED SEP 26 1972          3,694,509

SHEET 1 OF 2

INVENTORS:
PAUL N. RYLANDER
IRENE M. KARPENKO
BY GEORGE R. POND

ATTORNEY

INVENTORS:
PAUL N. RYLANDER
IRENE M. KARPENKO
BY GEORGE R. POND

*Miriam X. Leff*

ATTORNEY 3,694,509

SELECTIVE HYDROGENATION OF NITROAROMATICS TO THE CORRESPONDING N-ARYLHYDROXYLAMINE

BACKGROUND OF THE INVENTION

This invention relates to an improved method for selectively reducing nitroaromatics to produce N-arylhydroxylamines in high yield. The N-arylhydroxylamines are compounds in which the group —NHOH is attached to an aromatic nucleus. The invention is particularly applicable to the selective reduction of nitrobenzenes, and for convenience, the discussion below is mainly directed to the selective reduction of nitrobenzenes to produce N-phenylhydroxylamines.

It is well known that nitrobenzenes are reduced over platinum metal catalysts, usually in high yields, to anilines. N-phenylhydroxylamines, which may be formed as intermediates in the reduction do not appear as major constituents in the reaction media because of the competing reactions leading to anilines. These completing reactions involve the further reduction of the intermediates or the direct reduction of the nitrobenzenes without the formation of the intermediate phenylhydroxylamines. When there is less than a substantial formation of the desired intermediate product, production of these compounds from nitrobenzenes is impractical because of the difficulties of separation and purification of the products.

It is thus an object of the present invention to provide an improved and practical process for the production of N-phenylhydroxylamines from nitrobenzenes by catalytic hydrogenation. It is a particular object of this invention to provide a process for the selective catalytic hydrogenation of nitrobenzenes in which N-phenylhydroxylamines are formed in the reaction media in substantial amounts. It is a further object to provide a catalytic process for selectively hydrogenating nibrobenzenes in which there is a significant drop in the hydrogenation rate when two molar equivalents of hydrogen are absorbed, thus facilitating the production of N-phenylhydroxylamines in good yields.

These and other objects are accomplished by the hydrogenation of nitrobenzenes in neutral media in the presence of a precious metal catalyst and a selectivity agent.

THE INVENTION

In accordance with this invention an improved method is provided for producing N-arylhydroxyamines from nitroaromatic compounds comprising selectively hydrogenating nitroaromatic compounds in neutral media in the presence of a platinum group metal catalyst and in the presence of dimethylsulfoxide (DMSO).

The selectivity agent is the DMSO. It has been found that even very small additions of DMSO to the reaction mixture have a potent effect on the selectivity of the hydrogenation. While the amount of DMSO that can be employed can be varied considerably, there is a limiting value beyond which added amounts of DMSO have relatively little effect. Preferably the DMSO is present in an amount of about 0.1 mole to 100 moles per mole of catalyst metal.

The effect of DMSO as an additive in the hydrogenation of nitrobenzene can readily be seen by reference to the accompanying figures, which are graphical presentations of the results of experiments described below. Briefly:

FIG. 1 is a graph of product composition plotted against the amount of DMSO added. It shows the effect of the amount of DMSO on the yield of phenylhydroxylamine with other variables held constant.

FIG. 2 gives two curves in which the $H_2$ absorption is plotted against time. The curves compare the rate of $H_2$ absorption of a prior art system (using no DMSO) with that of the present invention, i.e. employing DMSO, and show 2 effect of the addition of DMSO On the hydrogenation rate.

Figure 3B:
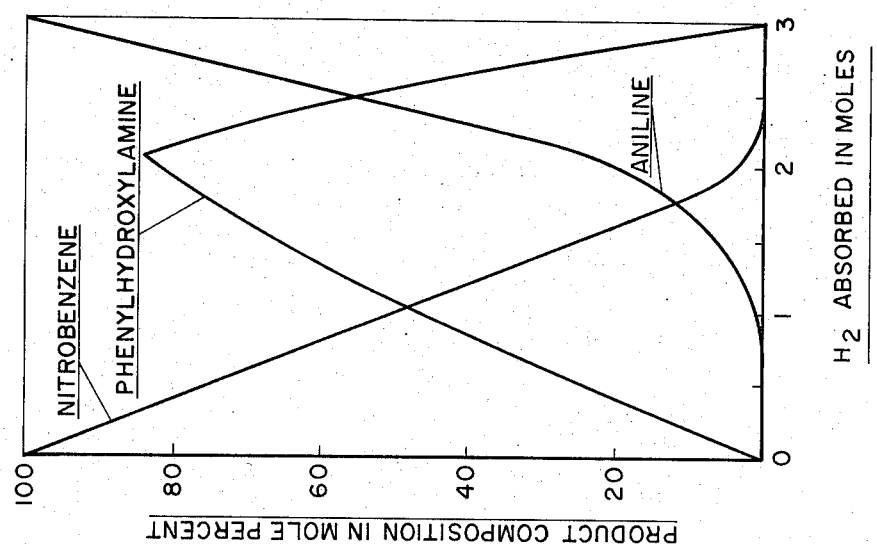
Figure 3A:
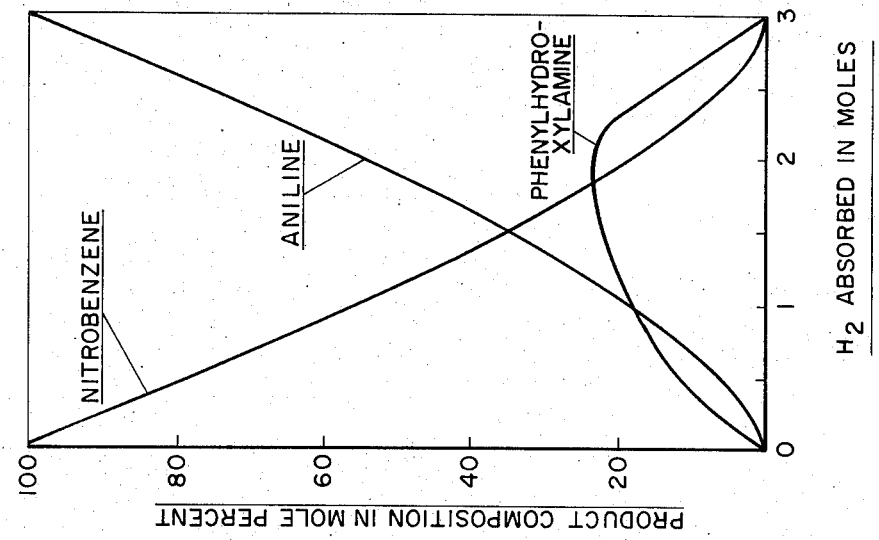

FIG. 3a shows the product composition as a function of the $H_2$ absorbed in a prior art system FIG. 3b is comparable to 3a except that DMSO is present in the system. A comparison of FIGS. 3a and 3b shows the effect of the addition of DMSO on the selectivity of the reaction.

The preferred catalyst for the present invention is platinum both with respect to the yield of arylhydroxylamines and the rate of hydrogen absorption. The platinum may be used unsupported, e.g. as the oxide, supported on a suitable carrier material, e.g. carbon, and/or in combination with other metals, e.g. an alloy or mixture of platinum and gold. Other platinum group metals may be used, including palladium, rhodium, iridium, and ruthenium, their oxides, and combinations thereof. Suitable supports include carbon, alumina, calcium carbonate, barium sulfate, preferably carbon. The catalyst concentration on the support may be from about 0.05 percent to 20 percent by weight, based on the weight of support; preferably from about 1 percent to 10 percent. The catalysts can be used repeatedly. Any of the catalyst preparations may be used. One method, for example, for preparing a supported platinum catalyst involves treating the carrier particles, which may be powders, spheres, granules, extrudates, etc., with an aqueous solution of a water-soluble compound of platinum and reducing the compound, depositing it thereby on the carrier, by contact with a reducing agent, e.g. a hydrogen stream. Generally the catalyst metal is present in the reaction mixture in an amount of from about 0.01 to 20 percent, based on the weight of the substrate, preferably 0.5 to 5 percent. The amount of the catalyst affects the rate of hydrogenation. Generally when less than about 0.01 percent of the catalyst metal is used, the rate is too low to be practical; and at concentrations above about 5 percent the small increase in rate does not justify the increased cost.

The selective reduction is carried out in neutral media. Suitably it is carried out in a liquid phase solution of the nitrobenzene substrate dissolved in a suitable inert neutral solvent. Examples of suitable solvents are: lower aliphatic alcohols such as methanol, ethanol, isopropanol, propanol n-butanol, t-butanol; liquid hydrocarbons such as benzene, hexane, heptane, cyclohexane, toluene, octane, xylene. Water may be used. Preferred solvents are lower aliphatic alcohols. Without solvent the reduction does not go as smoothly. It is more difficult to control the heat dissipated and coupled products tend to form. Too much solvent complicates recovery. Preferred ranges are from about 25 percent solvent to 99 percent solvent based on the weight of the substrate.

The hydrogenation may be conveniently carried out at ambient temperature and one atmosphere of hydrogen. However, the temperature may range from abut about 0° to 150°C., preferably about 25° to C. pressures from about 0.1 atm to 100 atm may be used. It is, of course, more convenient to operate at or above 1 atmosphere and no advantage is seen in using pressures higher than 100 psig, thus permitting the use of low pressure equipment.

Generally reaction rates increase with increased temperature and pressure. However, selectivity tends to decrease with increasing temperature, and higher costs become a factor with more severe conditions. It will be appreciated, therefore, that the conditions closest to ambient which achieve the desired result are used advantageously.

Operating under the above conditions including the presence of DMSO, the reaction proceeds until two molar equivalents of hydrogen are absorbed. At this point the rate of hydrogen absorption slows down markedly. Contrastingly, without DMSO the rate is constant over the absorption of 3 moles of hydrogen. The marked decrease in the rate of hydrogen absorption after 2 moles of hydrogen are absorbed facilitates stopping the reaction at the proper time for maximum arylhydroxylamine recovery.

The process is operated batchwise or continuously using conventional equipment. On absorption of about 2 molar equivalents of hydrogen or at a time when the hydrogen absorption rate decreases, or after suitable contact time (in a continuous process), the hydrogenation is interrupted, and the product N-arylhydroxylamine is recovered. For example, on absorption of 2 molar equivalents of hydrogen the catalyst is removed by filtration and the product recovered by known methods such as dilution with water, saturation with salt, cooling to 0°C., and removing the precipitated arylhydroxylamine by filtration.

The nitroaromatic compounds which may be employed as substrates in the process of this invention will be obvious to those skilled in the art. Typically they are nitrobenzene, nitronaphthalene, and derivatives thereof. With respect to the derivative compounds, generally, the process is applicable to mononitro and dinitro aromatics, but mono derivatives are preferred. Dinitro compounds, as 2, 4-dinitrotoluene, give a mixture of products. Aromatic nitro compounds having other easily reduced groups, as 4-nitrostyrene, undergo secondary changes and produce 4-ethyl-N-phenylhydroxylamine. Compounds, like 3-nitroacetophenone, with functions reactive to hydroxylamines may yield condensation products. Examples of derivative compounds suitable as substrates for our invention are alkyl substituted aromatic nitro compounds, as 4-nitrotoluene, 3-nitroethylbenzene, 2-methyl-4-nitrotoluene; halonitroaromatics as 3-chloronitrobenzene, 4-fluoronitrobenzene, and 5-chloro-1-nitronaphthalene; aminonitroaromatics, as 4-aminonitrobenzene, 3-N-methylaminonitrobenzene, and 4-N,N -dimethylaminonitrobenzene; aromatic nitronitriles, as 3-nitrobenzonitrile, and 4-nitrobenzylcyanide; aromatic alcohols, as 3-nitro-1-phenylethanol, 4-nitro-2-phenylethanol, and 4-nitrobenzyl alchohol; aromatic nitrophenols as, 4-nitrophenol and 3-nitro-5-methylphenol; aromatic nitro ethers, as 2-nitroanisole and 3-nitrophenetole. Arylhydroxylamines such as N-phenylhydroxylamines are valuable compounds for producing aminophenols. It is well known, for example, that the phenylhydroxylamines rearrange in acid, e.g., dilute sulfuric acid, to the aminophenols, which are important commercially in the production of dyes, antioxidants, developers, pharmaceuticals, and many other products. Phenylhydroxylamine is an intermediate in the preparation of cupferron, an analytical reagent.

The following examples are given to illustrate the present invention. In the experiments the same general procedure was employed, as follows:

A glass vessel was changed with substrate, solvent, catalyst, and various amounts of DMSO. The vessel was placed in a shaker and the reaction mixture was shaken while at ambient temperature under 1 atmosphere of hydrogen. The reaction was interrupted at various points in the reduction, the mixture filtered and the filtrate analyzed by gas chromatography.

EXAMPLE 1

In a series of experiments 2 ml of nitrobenzene, 100 ml of 80 percent ethyl alcohol and various amounts of catalysts were charged to a reactor. To this reaction mixture varying amounts of dimethylsulfoxide ranging from 0 to 2 ml were added. After 2 molar equivalents of hydrogen were absorbed the reaction was stopped and the filtrate was analyzed. Typical results are given in TABLE I and FIG. 1. FIG. 1 is a plot of the product composition against the amount of DMSO added in the tests using 5 percent Pt on carbon as the catalyst. The results in Table I show that Pt is a preferred catalyst for the selective hydrogenation of nitrobenzene. The marked effect of even a small amount of added DMSO on the product composition is shown dramatically in Table I and FIG. 1.

TABLE I

Hydrogenation of Nitrobenzene (100 ml 80% aqueous ethanol, 2 ml nitrobenzene, ambient temperature, one atmosphere hydrogen)

| Catalyst | Weight of Catalyst | Amount of dimethyl sulfoxide added | hydroxyl- amine | Phenyl Aniline | Nitro- benzene |
|---|---|---|---|---|---|
| 5% Pd/C | 30 mg | none | 4.8 | 68.2 | 27.0 |
| 5% Rh/C | 100 mg | none | 18.0 | 57.9 | 24.1 |
| 5% Ir/C | 250 mg | none | 9.9 | 63.2 | 26.9 |
| 5% Ru/C C | 500 mg | none | 1.4 | 65.3 | 33.3 |
| 5% Os/C | 1000 mg | none | 2.7 | 62.7 | 34.6 |
| 5% Pt/C | 100 mg | none | 24.7 | 53.1 | 22.2 |
| 5% Pt/C | 100 mg | 0.125 ml | 67.6 | 26.0 | 6.4 |
| 5% Pt/C | 100 mg | 0.25 ml | 76.9 | 20.4 | 2.7 |
| 5% Pt/C | 100 mg | 0.50 ml | 80.4 | 16.8 | 2.8 |
| 5% Pt/C | 100 ml | 1.00 ml | 86.0 | 13.1 | 0.9 |
| 5% Pt/C | 100 mg | 1.50 ml | 85.7 | 12.8 | 1.5 |
| 5% Pt/C | 100 mg | 2.00 ml | 84.6 | 13.9 | 1.5 |
| 1% Pt/C | 250 mg | none | 47.2 | 41.1 | 11.7 |
| 1% Pt/C | 250 mg | 0.5 ml | 77.6 | 18.6 | 3.8 |
| 1% Pt/C | 250 mg | 1.0 ml | 84.3 | 13.0 | 2.7 |
| 1% Pt/C | 250 mg | 1.5 ml | 85.2 | 13.0 | 1.8 |
| 1% Pt/C | 250 mg | 2.0 ml | 84.8 | 13.5 | 1.7 |
| PtO$_2$ | 15 mg | none | 2.5 | 68.7 | 28.8 |
| PtO$_2$-Au$_2$O$_3$ 90:10 | 15 mg | none | 3.2 | 69.2 | 27.6 |
| PtO$_2$-Au$_2$O$_3$ 90:10 | 15 mg | 1.0 ml | 53.5 | 44.2 | 2.3 |

EXAMPLE 2

In a series of experiments 2 ml of nitrobenzene, 100 ml. of 80 percent ethyl alcohol, 100 mg. of 5 percent Pt on carbon, and various amounts of DMSO were charged to a reactor. In these tests the rate of hydrogen absorption and the product composition on absorption of various increments of hydrogen were determined. The product composition was determined by gas chromatography. Typical results are tabulated in Table II and FIGS. 2, 3a, and 3b.

In Table II: The tests of the group labeled A show the effect of the concentration of DMSO on the rate of hydrogenation and the product composition. The tests of group B show the rate of hydrogenation and the product composition after absorption of successive increments of hydrogen in a hydrogenation system according to the prior art, i.e., with no DMSO present. Group C is comparative to group B, except that 1 ml of DMSO is present, in accordance with the present invention.

FIG. 2 is a graph of hydrogenation rates obtained in comparative tests in which no DMSO and 1 ml of DMSO were used. Curve B represents the results with the prior art system, i.e., without DMSO. Curve C represents the results with 1 ml of DMSO added.

FIG. 3a is increased temperature of pressure. composition as a function of hydrogen absorbed temperature, a prior art system, using no DMSO. FIG. 3b is a plot comparable to that of 3a except that 1 ml of DMSO is present in the reaction mixture.

The results in TABLE II show that increasing quantities of DMSO have a striking effect on the rate of hydrogenation. Initial small additions of DMSO sharply increase the rate whereas further larger additions have relatively little effect. Group C tests (with 1 ml DMSO) of TABLE II and FIG. 2 show that the rate of hydrogenation is sharply limited after absorption of 2 moles of hydrogen, i.e., the rate of hydrogenation of phenylhydroxylamine is decreased relatively more than for nitrobenzene. With 1 ml DMSO, the rates of hydrogenation for the first 2 moles and for a third mole are 19.2 ml $H_2$/min and 2.7 ml $H_2$/min, respectively. Without DMSO the rate is constant over 3 moles. As indicated above, the sharp decline in rate after 2 moles of hydrogen are absorbed facilitates the recovery of a maximum amount of the intermediate product.

The marked effect of DMSO on the selectivity of the hydrogenation is clearly shown in the comparison of FIGS. 3a and 3b. Without DMSO, the maximum yield of phenylhydroxylamine is about 23 percent; (FIG. 3a) whereas in its presence the maximum yield is 85 percent (FIG. 3b).

Variations and modifications which will be obvious and apparent to those skilled in the art may be made in the invention without departing form the spirit and scope thereof.

TABLE II (100 ml 80% ethanol, 2 ml nitrobenzene, ambient temperature, one atmosphere hydrogen)

| Tests | DMSO Added | $H_2$ Absorbed Moles | time | % PHA | % Aniline | % Nitrobenzene |
|---|---|---|---|---|---|---|
|   | None | 2.00 | 23'50" | 24.7 | 53.1 | 22.2 |
|   | 0.125 ml | 2.00 | 37'35" | 67.6 | 26.0 | 6.4 |
|   | 0.25 | 2.00 | 44'25" | 76.9 | 20.4 | 2.7 |
| A | 0.50 | 2.00 | 47'15" | 80.4 | 16.8 | 2.8 |
|   | 1.00 | 2.00 | 61'31" | 86.0 | 13.1 | 0.9 |
|   | 1.50 | 2.00 | 61'07" | 85.7 | 12.8 | 1.5 |
|   | 2.00 | 2.00 | 74'20" | 84.6 | 13.9 | 1.5 |
|   | None | 0.25 | 3'23" | 7.5 | 2.2 | 90.3 |
|   | None | 1.00 | 13'36" | 18.6 | 22.6 | 58.8 |
|   | None | 1.50 | 15'30" | 20.6 | 37.4 | 42.0 |
| B | None | 19'03" |  | 24.5 | 42.6 | 32.9 |
|   | None | 2.00 | 23'50" | 24.7 | 53.1 | 22.2 |
|   | None | 2.25 | 25'09" | 21.7 | 67.9 | 10.4 |
|   | None | 2.50 | 30'00" | 15.0 | 81.9 | 3.1 |
|   | 1.00 | 0.50 | 12'57" | 30.1 | 0 | 69.9 |
|   | 1.00 | 1.00 | 24'30" | 50.0 | 0.9 | 49.1 |
|   | 1.00 | 1.50 | 34'09" | 65.9 | 5.2 | 28.9 |
| C | 1.00 | 1.75 | 45'00" | 75.4 | 9.1 | 15.5 |
|   | 1.00 | 2.00 | 61'31" | 86.0 | 13.1 | 0.9 |
|   | 1.00 | 2.25 | 81'11" | 71.6 | 28.4 | 0 |
|   | 1.00 | 2.50 | 119'08" | 50.0 | 50.0 | 0 |

What is claimed is:

1. In a process for the reduction of an aromatic nitrocompound to produce the corresponding N-arylhydroxylamine wherein a solution of the aromatic nitrocompound in a neutral solvent is contacted with hydrogen at a temperature of from about 0° C. to about 150°C. and a pressure of from 0 to 100 psig in the presence of a platinum-containing catalyst until about 2 mols of hydrogen per mol of aromatic nitrocompound are absorbed and the N-arylhydroxylamine is separated from the reaction mixture, the improvement which comprises effecting said contacting in the added presence of from 0.1 to 100 mols per mol of catalyst metal, of dimethylsulfoxide.

2. The process as defined in claim 1 wherein the aromatic nitrocompound which is reduced is nitrobenzene and phenylhydroxylamine is recovered.

* * * * *